United States Patent
Yeganeh et al.

(10) Patent No.: US 11,638,051 B2
(45) Date of Patent: Apr. 25, 2023

(54) REAL-TIME LATENCY MEASUREMENT OF VIDEO STREAMS

(71) Applicant: SSIMWAVE INC., Waterloo (CA)

(72) Inventors: Hojatollah Yeganeh, Waterloo (CA); Jiheng Wang, Waterloo (CA); Kai Zeng, Kitchener (CA); Kaiwen Ye, North York (CA); Abdul Rehman, Kitchener (CA); Zhou Wang, Waterloo (CA)

(73) Assignee: SSIMWAVE, Inc., Waterloo (CA)

( * ) Notice: Subject to any disclaimer, the term of this patent is extended or adjusted under 35 U.S.C. 154(b) by 153 days.

(21) Appl. No.: 17/187,048

(22) Filed: Feb. 26, 2021

(65) Prior Publication Data

US 2021/0274231 A1    Sep. 2, 2021

Related U.S. Application Data

(60) Provisional application No. 63/002,761, filed on Mar. 31, 2020, provisional application No. 62/982,485, filed on Feb. 27, 2020.

(51) Int. Cl.
*H04N 21/24* (2011.01)
*H04L 43/0882* (2022.01)
(Continued)

(52) U.S. Cl.
CPC ..... *H04N 21/2401* (2013.01); *H04L 43/0858* (2013.01); *H04L 43/0882* (2013.01);
(Continued)

(58) Field of Classification Search
CPC ......... H04N 21/2401; H04N 21/23418; H04N 21/44008; H04N 21/44004; H04N 21/4545; H04L 43/0858; H04L 43/0882
See application file for complete search history.

(56) References Cited

U.S. PATENT DOCUMENTS 5,446,492 A * 8/1995 Wolf ........................ H04N 5/04
348/E17.001
6,493,023 B1 * 12/2002 Watson ................ H04N 17/004
348/E17.001
(Continued)

FOREIGN PATENT DOCUMENTS

EP           967811 A2 * 12/1999    ............. H04N 17/00
EP         2323046 A1 *  5/2011    ....... G06F 17/30787
(Continued)

*Primary Examiner* — James R Sheleheda
(74) *Attorney, Agent, or Firm* — Brooks Kushman P.C.

(57) ABSTRACT

Frames of a video stream collected at first and second points along a video delivery chain are buffered into first and second buffers, respectively, the second point being downstream the video delivery chain from the first point. A control group is identified as a subset of frames of the second buffer. Correlations of extracted features of the control group to extracted features of successive windows of frames of the first buffer are computed, the extracted features being based on spatial information and temporal information of the video stream. A delay between the video stream collected at the first point and the video stream collected at the second point is identified according to a maximum correlation of the correlations.

44 Claims, 10 Drawing Sheets

(51) Int. Cl.
*H04N 21/4545* (2011.01)
*H04N 21/44* (2011.01)
*H04L 43/0852* (2022.01)
*H04N 21/234* (2011.01)

(52) U.S. Cl.
CPC . *H04N 21/23418* (2013.01); *H04N 21/44004* (2013.01); *H04N 21/44008* (2013.01); *H04N 21/4545* (2013.01)

(56) References Cited

U.S. PATENT DOCUMENTS

| | | | |
|---|---|---|---|
| 8,330,792 B2 | 12/2012 | Beers et al. | |
| 9,188,644 B1 | 11/2015 | Blanton et al. | |
| 9,538,171 B2 | 1/2017 | Marchya et al. | |
| 10,063,907 B1* | 8/2018 | Darrah | H04N 21/44008 |
| 10,116,838 B2* | 10/2018 | Carrieres | H04N 5/04 |
| 11,363,345 B2* | 6/2022 | Wang | H04N 21/44209 |
| 2002/0093917 A1* | 7/2002 | Knobbe | H04L 43/0811 |
| | | | 370/252 |
| 2004/0086193 A1* | 5/2004 | Kameyama | H04N 5/145 |
| | | | 382/254 |
| 2006/0114993 A1* | 6/2006 | Xiong | H04N 19/615 |
| | | | 375/E7.032 |
| 2007/0206095 A1* | 9/2007 | Kawada | H04N 17/02 |
| | | | 348/192 |
| 2011/0022638 A1* | 1/2011 | Jiang | G06F 16/683 |
| | | | 707/805 |
| 2016/0212432 A1* | 7/2016 | Wang | G06V 20/40 |
| 2016/0234505 A1 | 8/2016 | Kim | |
| 2016/0323166 A1* | 11/2016 | Pandey | H04L 43/0852 |
| 2018/0240221 A1* | 8/2018 | Rijnders | G06T 5/10 |
| 2019/0238872 A1* | 8/2019 | Westwater | H04N 19/48 |
| 2020/0314503 A1* | 10/2020 | Wang | H04L 65/75 |

FOREIGN PATENT DOCUMENTS

| | | | | |
|---|---|---|---|---|
| EP | 2413612 B1 * | 2/2015 | | H04N 17/004 |
| WO | WO-2016068760 A1 * | 5/2016 | | |
| WO | 2020194092 A1 | 10/2020 | | |

\* cited by examiner

REAL-TIME LATENCY MEASUREMENT OF VIDEO STREAMS

CROSS-REFERENCE TO RELATED APPLICATIONS

This application claims the benefit of U.S. provisional application Ser. No. 62/982,485 filed Feb. 27, 2020, and U.S. provisional application Ser. No. 63/002,761 filed Mar. 31, 2020 the disclosures of which are hereby incorporated in their entireties by reference herein.

TECHNICAL FIELD

Aspects of the disclosure generally relate to real-time latency measurement of video streams. Further aspects of the disclosure generally relate to the measurement of real-time alignment of co-located video streams, as well as the use of such measurements in identifying latency between the co-located streams.

BACKGROUND

Real-time latency measurement between two videos can be very time consuming and cumbersome. One example technique for performing temporal alignment and consequently latency measurement is a manual process such as monitoring the frames of two videos and aligning them visually. Another technique that may be used is the performance of expensive frame-based measurement to find matched frames between the videos. Such methods, however, may run into timing constraints or may be overly complex to be practical.

SUMMARY

In a first illustrative embodiment, a method for identifying real-time latency of video streams, includes buffering frames of a video stream collected at a first point along a video delivery chain into a first buffer; buffering frames of a video stream collected at a second point along the video delivery chain into a second buffer, the second point being downstream the video delivery chain from the first point; identifying a control group as a subset of frames of the second buffer; computing correlations of extracted features of the control group to extracted features of successive windows of frames of the first buffer, the extracted features being based on spatial information and temporal information of the video stream; and identifying a synchronization offset between the video stream collected at the first point and the video stream collected at the second point according to a maximum correlation of the correlations.

In a second illustrative example, a system for identifying real-time latency of video streams, includes a computing device programmed to buffer frames of a video stream collected at a first point along a video delivery chain into a first buffer; buffer frames of a video stream collected at a second point along the video delivery chain into a second buffer, the second point being downstream the video delivery chain from the first point; identify a control group as a subset of frames of the second buffer; compute correlations of extracted features of the control group to extracted features of successive windows of frames of the first buffer, the extracted features being based on spatial information and temporal information of the video stream; and identify a delay between the video stream collected at the first point and the video stream collected at the second point according to a maximum correlation of the correlations.

In a third illustrative embodiment, a method for identifying real-time latency of co-located video streams is described. Frames of a reference video stream and a test video stream are buffered. Calculations are performed on the buffered reference frames to identify valid candidate frames for which spatial information of the respective buffered reference frame exceeds a spatial information threshold level of information, and temporal information of the respective buffered reference frame exceeds a temporal information threshold level of information. A control group pattern vector indicating a pattern of valid frames is constructed. Using a sliding window approach, a window is advanced through frames of the test video stream to extract temporal and spatial features and to compute differences and correlation between the pattern of valid frames of the reference video stream and corresponding frames of the window in the test video stream according to the temporal and spatial features, such that a sum of difference values in each window is computed as a group difference for the respective window. A frame offset is determined between the reference video stream and the test video stream according to the group difference and the correlation. A latency between the reference video stream and the test video stream is computed according to reading times of the reference video stream and the test video stream, frame rates of the reference video stream and the test video stream, and the frame offset between the reference video stream and the test video stream. The reference video stream and the test video stream are aligned according to the latency.

In a fourth illustrative embodiment, a system for identifying real-time latency of co-located video streams includes a computing device. The computing device is programmed to buffer frames of a reference video stream and a test video stream; performing calculations on the buffered reference frames to identify valid candidate frames for which spatial information of the respective buffered reference frame exceeds a spatial information threshold level of information, and temporal information of the respective buffered reference frame exceeds a temporal information threshold level of information; construct a control group pattern vector indicating a pattern of valid frames; use a sliding window approach, advancing a window through frames of the test video stream to extract temporal and spatial features and to compute differences and correlation between the pattern of valid frames of the reference video stream and corresponding frames of the window in the test video stream according to the temporal and spatial features, such that a sum of difference values in each window is computed as a group difference for the respective window; determine a frame offset between the reference video stream and the test video stream according to the group difference and the correlation; compute a latency between the reference video stream and the test video stream according to reading times of the reference video stream and the test video stream, frame rates of the reference video stream and the test video stream, and the frame offset between the reference video stream and the test video stream; and align the reference video stream and the test video stream according to the latency.

In a fifth illustrative embodiment, a non-transitory computer-readable medium includes instructions for identifying real-time latency of co-located video streams, that when executed by a processor of a computing device, cause the computing device to buffer frames of a reference video stream and a test video stream; performing calculations on the buffered reference frames to identify valid candidate frames for which spatial information of the respective buffered reference frame exceeds a spatial information threshold level of information, and temporal information of the respective buffered reference frame exceeds a temporal information threshold level of information; construct a control group pattern vector indicating a pattern of valid frames; use a sliding window approach, advancing a window through frames of the test video stream to extract temporal and spatial features and to compute differences and correlation between the pattern of valid frames of the reference video stream and corresponding frames of the window in the test video stream according to the temporal and spatial features, such that a sum of difference values in each window is computed as a group difference for the respective window; determine a frame offset between the reference video stream and the test video stream according to the group difference and the correlation; compute a latency between the reference video stream and the test video stream according to reading times of the reference video stream and the test video stream, frame rates of the reference video stream and the test video stream, and the frame offset between the reference video stream and the test video stream; and align the reference video stream and the test video stream according to the latency.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
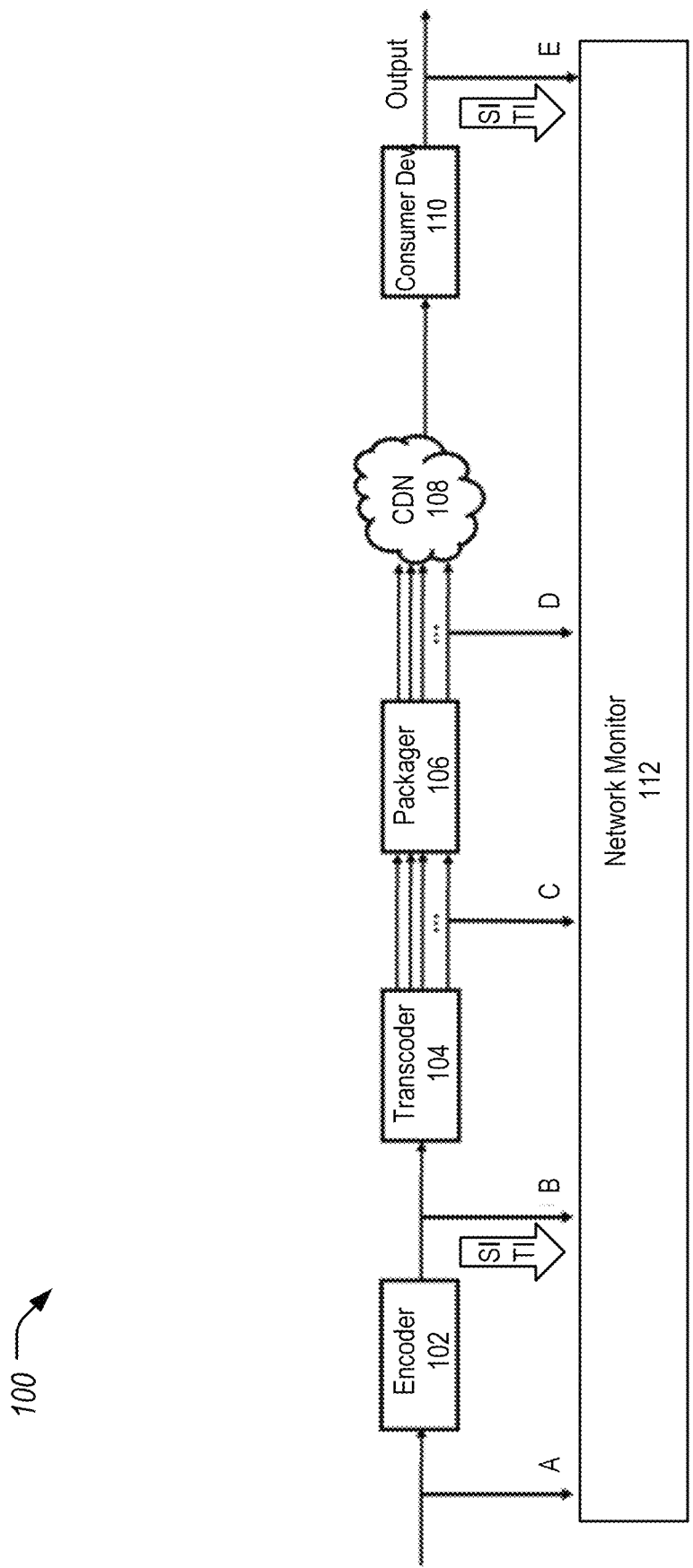
FIG. 1 illustrates an example of an end-to-end system for the use of feature-based techniques to measure latency along a stream transmission pipeline.

FIG. 1 illustrates an example of an end-to-end system 100 for the use of feature-based techniques to measure latency along a stream transmission pipeline. In the illustrated example, a video delivery chain includes a sequence of one or more encoder 102, transcoder 104, packager 106, content delivery network 108, and home viewing/consumer device 110. Each of the devices along the video delivery chain may perform operations that involve video quality degradations and latencies. The source video feed may be in the format of many video formats, for example, serial digital interface (SDI), transport stream, multicast Internet Protocol (IP), or mezzanine files from content producers/providers. For home television (TV), there are often set-top boxes that replay the received video streams to TV, e.g. through high-definition multimedia interface (HDMI) cables. As explained in detail below, a network monitor 112 may monitor the end-to-end system 100 for latency using buffered information identified from content streams at various points along the video delivery chain. It should be noted that the video delivery chain may be geographically diverse and that the calculations may occur co-located or in a distributed manner.

An instance of video content may include, as some examples, live video feeds from current events, prerecorded shows or movies, and advertisements or other clips to be inserted into other video feeds. The video content may include just video in some examples, but in many cases the video further includes additional content such as audio, subtitles, and metadata information descriptive of the content and/or format of the video. In general, the system 100 includes one or more sources of instances of video content. When a video distributor receives source video, the distributor passes the video content from content sources through a sophisticated video delivery chain such as shown, including the series of encoders 102, transcoders 104, packagers 106, content delivery networks 108, and consumer devices 110 to ultimately present the video content.

More specifically, one or more encoders 102 may receive the video content from the sources. The encoders 102 may be located at a head-end of the system 100. The encoders 102 may include electronic circuits and/or software configured to compress the video content into a format that conforms with one or more standard video compression specifications. Examples of video encoding formats include Moving Picture Experts Group (MPEG)-2 Part 2, MPEG-4 Part 2, H.264 (MPEG-4 Part 10), High Efficiency Video Coding (HEVC), Theora, RealVideo RV40, VP9, and AV1. In many cases, the compressed video lacks some information present in the original video, which is referred to as lossy compression. A consequence of this is that decompressed video may have a lower quality than the original, uncompressed video.

One or more transcoders 104 may receive the encoded video content from the encoders 102. The transcoders 104 may include electronic circuits and/or software configured to re-encode the video content from a source format, resolution, and/or bit depth into an instance of video content with a different format, resolution, and/or bit depth. In many examples, the transcoders 104 may be used to create, for each received instance of video content, a set of time-aligned video streams, each with a different bitrate and frame size. This set of video streams may be referred to as a ladder or compression ladder. It may be useful to have different versions of the same video streams in the ladder, as downstream users may have different bandwidth, screen size, or other constraints. In some cases, the transcoders 104 may be integrated into the encoders 102, but in other examples the encoders 102 and transcoders 104 are separate components.

One or more packagers 106 may have access to the ladders for each of the instances of video content. The packagers 106 may include hardware and/or software configured to create segmented video files to be delivered to clients that then stitch the segments together to form a contiguous video stream. The segmented video may include video fragments, as well as a manifest that indicates how to combine the fragments. The packager 106 may sometimes be integrated into the encoder 102 and/or transcoder 104 that first creates the digital encoding of the instance of video content, but often it is a separate component. In one example, the transcoders 104 and packagers 106 may be located in a media data center between the head-end and the content delivery network 108.

The packagers 106 may provide the packaged video content to one or more origins to the content delivery network 108. The origins refer to a location of the content delivery network 108 to which video content enters the content delivery network 108. In some cases, the packagers 106 serve as origins to the content delivery network 108, while in other cases, the packagers 106 push the video fragments and manifests into the origins. The content delivery network 108 may include a geographically-distributed network of servers and data centers configured to provide the video content from the origins to destination consumer devices 110. The consumer devices 110 may include, as some examples, set-top boxes connected to televisions or other video screens, tablet computing devices, and/or mobile phones. Notably, these varied consumer devices 110 may have different viewing conditions (including illumination and viewing distance, etc.), spatial resolution (e.g., standard definition (SD), high definition (HD), full-HD, ultra-high definition (UHD), 4K, etc.), frame rate (15, 24, 30, 60, 120 frames per second, etc.), dynamic range (8 bits, 10 bits, and 12 bits per pixel per color, etc.). The consumer device 110 may execute a video player to play back the video content received to the consumer devices 110 from the content delivery network 108.

The video content may differ in video profile (e.g., codec, codec profile, codec level, resolution, frame rate, etc.) and in bitrate range along the stream transmission pipeline. For instance, at point A before the encoder 102, the video may be in a format such as ProRes/MPEG2/JPEG 2000, with a bitrate range such as between 100 Mbps-200 Mbps. At point B, after the encoder 102 and before the transcoder 104, the video may be in a format such as MPEG2, with a bitrate range of 20 Mbps-50 Mbps. At point C, after the transcoder 104 but before the packager 106, the video may be in a format such as H.264/HEVC, with a bitrate range between 500 Kbps-3.6 Mbps. At point D, after the packager 106 and at entry to the content delivery network 108, the video may be segmented and encrypted H.264/HEVC, also with a bitrate range between 500 Kbps-3.6 Mbps. At point E, after receipt and decoding by the home viewing consumer device 110, the video may be in a format such as 1060p or 720p via an HDMI output.

Objective Quality-of-Experience (QoE) scores may be computed at various points along the stream transmission pipeline (e.g., two or more of the Points A through E). QoE of a video, as used herein, relates to mapping human perceptual QoE onto an objective scale, i.e., the average score given by human subjects when expressing their visual QoE when watching the playback of a video content. For example, a score may be defined on a scale of 0-100, which can be evenly divided to five quality ranges of bad (0-19), poor (20-39), fair (40-59), good (60-79), and excellent (80-100), respectively. One example objective QoE score is the SSIMPLUS score.

A network monitor 112 may be configured to monitor the streams that are provided along the video delivery chain. In one example, the network monitor 112 may receive the QoE scores for the streams in a periodic manner from computing devices at the points along the video delivery chain (e.g., the points A through E). In another example, the network monitor 112 may generate the signatures itself.

As discussed in detail herein, the network monitor 112 may align these streams. If the source video streams, derivative video streams, and/or video streams at the client side (e.g., at the HDMI outputs) are not fully synchronized temporally, it may be difficult to report and compare the objective QoE scores along the stream transmission pipeline. Thus, it may be desirable to implement a unified time system to provide an accurate and efficient video quality monitoring service throughout the whole transmission system.

To determine the relative timing, the network monitor 112 may be configured to extract spatial and temporal features using different filters on multiple video streams at different locations. These features may then be analyzed by the network monitor 112 to determine the latency between different video streams. Thus, the QoE scores calculated at different locations for different video streams may be synchronized and comparable.

Figure 2:
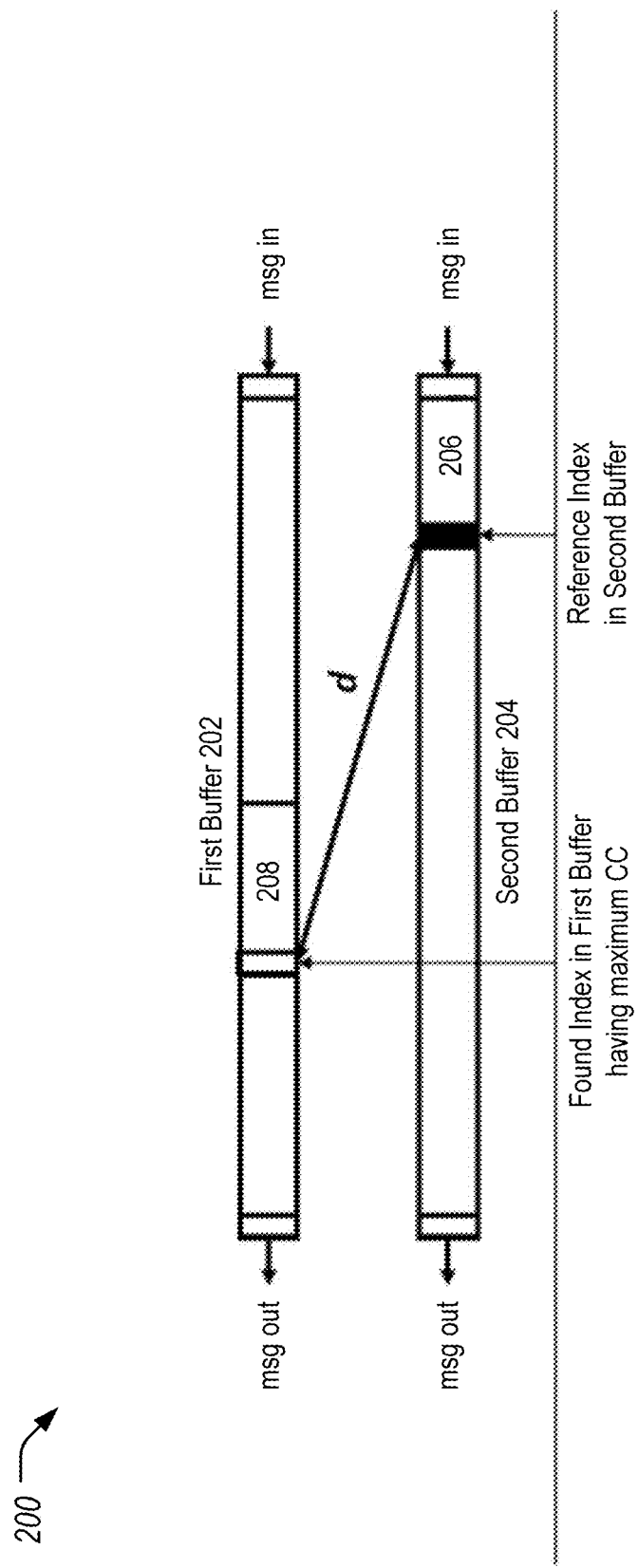
FIG. 2 illustrates an example diagram illustrating a key latency searching algorithm.

FIG. 2 illustrates an example diagram illustrating a key latency searching algorithm. The latency searching algorithm may be used to determine index delay d, which refers to an amount of delay of the same content in the video stream as captured at a first point and the video stream as captured at a second point. Referring to FIG. 2, and with continued reference to FIG. 1, in the illustrated example spatial information and temporal information may be captured at point B and also at point E. Spatial information (SI), or spatial features, refers to aspects of the information within a frame, such as textures, highlights, etc. Temporal information (TI), or temporal features, refers to aspects of the information between frames, such as motion or other differences between frames. A first buffer 202 may be used to cache stream content as captured at the point B, and a second buffer 204 may be used to cache stream content as captured at the point E.

The latency searching algorithm may utilize correlation scores of the SI and the TI between different segments captured at different points along the stream transmission pipeline to identify the delay d between those points. This correlation may be formed between a control group 206 portion of the second buffer 204 compared to a sliding window comparison portion 208 of the first buffer 202. The control group 206 may be of a predefined size (e.g., 30 seconds), and the comparison portion may also be of the same predefined size. The comparison portion of the first buffer 202 having the greatest correlation may be identified and used to determine the index delay d. For instance, a comparison may be made of the control group 206 to a first window of the first buffer 202, starting at a first frame position of the first buffer 202 and extending in consecutive frames for the predefined size of frames of the comparison portion. Additionally, a comparison may be made of the control group 206 to a second window starting at a next frame position of the first buffer 202 and extending for the predefined size. Notably, between these windows the first and second windows overlap for all but the first and last frames. This process may continue until no further frames are available to slide the window. The highest correlation value out of these comparisons may be identified as the comparison portion of the first buffer 202 having the greatest correlation.

As some examples, the spatial features may be extracted using one or more of a Gaussian filter, a Laplacian filter, a Laplacian of a Gaussian filter, a Sobel filter, a Prewitt filter, and/or a Scharr filter. As some other examples, the temporal features may be extracted using one or more of the average/min/max difference of consecutive frames in terms of raw pixel values, Gaussian filtered pixel values, Laplacian filtered pixel values, Laplacian of Gaussian filtered pixel values, Sober filtered pixel values, Prewitt filtered pixel values, and/or Scharr filtered pixel values.

The correlation may operate on data representations of extracted features from the control group 206 portion of the second buffer 204 compared to a sliding window comparison portion 208 of extracted features of the first buffer 202 to calculate how closely those extracted features are related. One correlation metric that may be used is the Pearson Linear Correlation Coefficient (PLCC) but other correlation functions may be used as well. As some other examples, mean squared error (MSE), root mean squared error (RMSE), mean absolute error (MAE), peak signal-to-noise ratio (PSNR), Spearman's rank correlation coefficient (SRCC), and/or Kendall's rank correlation coefficient (KRCC) may additionally or alternatively be used.

It should be noted that the extracted SI and TI features may additionally or alternately be based on subsets of the data in the frames of the video stream. For instance, as one example each video stream may be decomposed into different scales and resolutions, and a different filter may be used to extract features for each scale resolution. In another example, each video stream may be decomposed into different frequency bands, and a different filter may be used to extract features for each frequency band. In yet another example, each video stream may be decomposed into different spatial regions, and a different filter may be used to extract features for each spatial region. Or, each video stream may be decomposed into different groups of frames, and a different filter may be used to extract features for each group of frames. In yet another example, each video stream may be sorted into different content types (e.g., news, shows, sports, movies, animation, screen content, etc.), and a different filter may be used for each content type. In another possibility, each video stream may be decomposed into different distortion types (e.g., compression by different video codecs and configurations, transmission errors, frame freezing, scale change, frame rate change and frame drop, etc.), and a different filter may be used for each distortion type. In yet another possibility, each video stream may be decomposed into different complexity levels in terms of spatial, temporal and/or color complexities (e.g., where complicity may relate to an inverse of QoE), and a different filter may be used for each complexity level.

Combinations of techniques may be used as well to provide for the extraction of features. For instance, wavelet or other multi-scale signal analysis methods may be used to decompose each video stream frame into multi-scales (multi-resolutions), where human visual contrast sensitive models are used to guide the combinations of cross-scale extracted features. Or, 2D or 3D Fourier or Discrete Cosine Transform (DCT) analysis methods may be used to decompose each video stream frame (one frame) or video volume (multiple frames) into multiple frequency bands, where human visual contrast sensitive models are used to guide the combinations of cross frequency band extracted features. Or, region segmentation methods may be used to divide each video stream frame into different regions, or visual saliency evaluation methods may be used to assign spatially-varying importance factors to different pixels in each video frame, where the segmentation results or saliency-based importance factors are used to guide the combinations of cross-space extracted features. Or, region segmentation methods may be used to divide each video stream frame into different regions, visual saliency evaluation methods may be used to assign spatially varying importance factors to different pixels in each video frame, and the segmentation results or saliency-based importance factors may be used to guide the combinations of cross-space extracted features. Or, each video stream may be divided into group of frames statically (fixed group size) or dynamically (varying size based on content complexity or scene cut detection), and group-of-frame importance assessment methods may be used to guide the combinations of per group-of-frame extracted features. Or, each video stream frame or groups of frames may be classified into different content types, and the content types may be used to guide the combinations of content-type-dependent extracted features. Or, each video stream may be classified as a whole, or the video stream frames or groups of frames may be classified into different distortion types, and the distortion types may be used to guide the combinations of distortion-type dependent extracted features. Or, each video stream frame or spatial regions of video frames may be classified into different complexity levels of different complexity measures (spatial, temporal, color, etc.), and the complexity levels and measures may be used to guide the combinations of complexity dependent extracted features.

Figure 3:
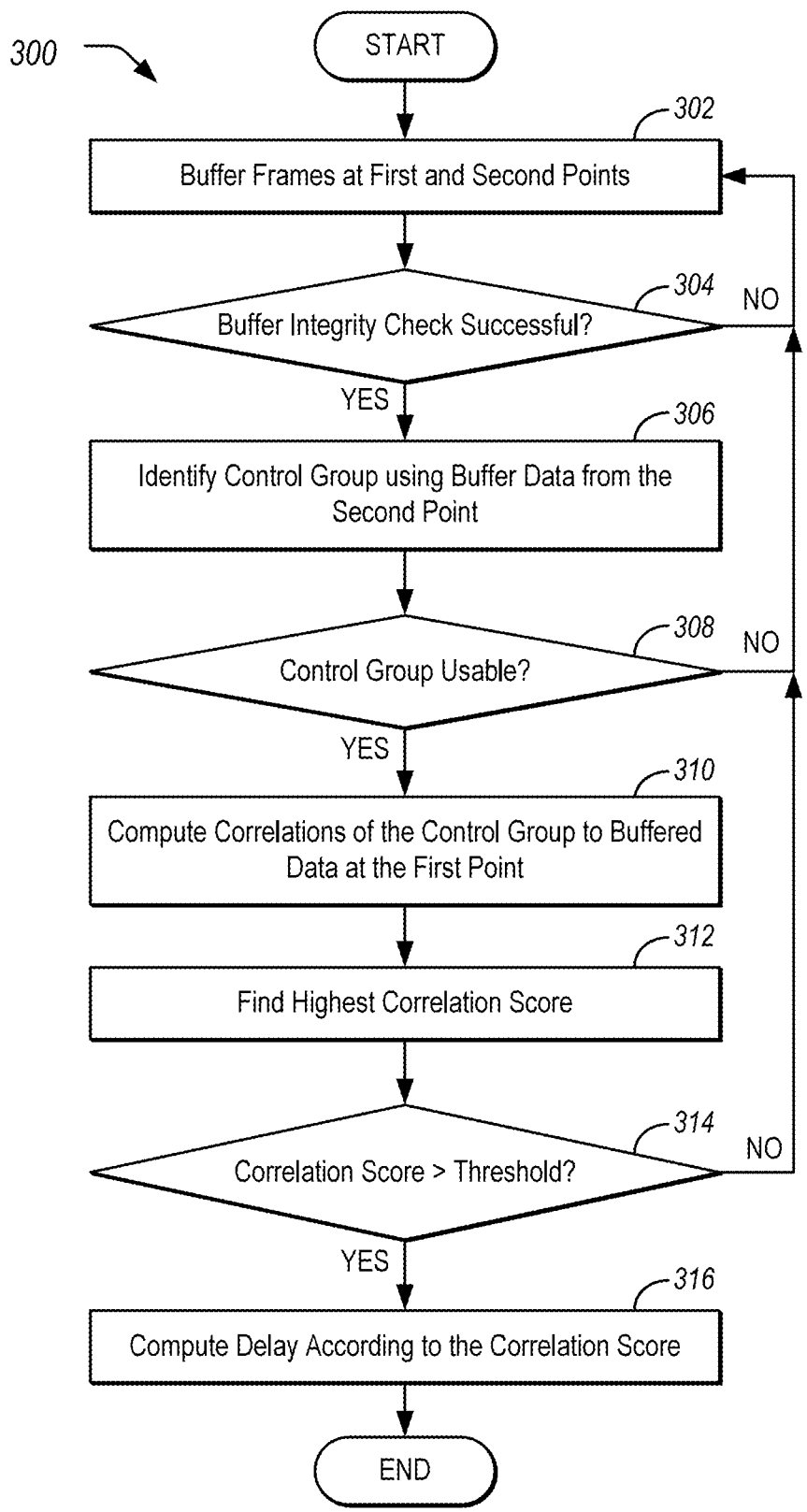
FIG. 3 illustrates an example process for performing the key latency searching algorithm.

FIG. 3 illustrates an example process 300 for performing the key latency searching algorithm. In an example, the process 300 may be performed by the network monitor 112 in the context of the end-to-end system 100.

At operation 302, the network monitor 112 buffers frames received from first and second points along the stream transmission pipeline. In an example, the network monitor 112 receives frames from a first point and places the frames into a first buffer 202 and receives frames from a second point downstream from the first point and places those frames into a second buffer 204. In one non-limiting example, the default buffer length of the first and second buffers is each two and a half minutes of content. The frames received by the network monitor 112 may also include metadata information or otherwise be associated with metadata information received by the network monitor 112. This metadata information may include timestamps, such as presentation time stamps indicative of the timing of the frames of the video. As another possibility, the timestamps of the frames may refer to arrival times of the frames of the video to the points along the stream transmission pipeline.

At operation 304, the network monitor 112 performs buffer integrity checks. In an example, the buffer integrity checks may include confirming that the timestamps of the frames in each of the first buffer 202 and the second buffer 204 are continuous. Additionally or alternatively, the buffer integrity checks may include confirming that the maximum timestamp difference between the first buffer 202 and the second buffer 204 is not larger than the default buffer length. If the buffer checks succeed, control passes to operation 306. If not, then the process returns to operation 302 to reconstruct the buffers.

At operation 306, the network monitor 112 identifies the control group 206 using buffer data from the second buffer 204. In one example, the control group 206 is identified as being the most recent portion of the second buffer 204 (e.g., the most recent 30 seconds). It should be noted, however, that the specific location of the control group 206 is arbitrary. Moreover, it should also be noted that a larger control group 206 may increase accuracy of the process 300 but at the expense of additional commuting resources.

At operation 308, the network monitor 112 confirms that the control group 206 is usable. In an example, the network monitor 112 examines the mean and variance of the control group 206 to ensure that these values are greater than predefined thresholds $TH_{MEAN}$ and $TH_{VARIANCE}$ respectively. In one nonlimiting example, $TH_{MEAN}=1$ & $TH_{VARIANCE}=1$. If these thresholds are not met, then for example, the control group 206 may lack adequate information to make a good correlation with the sliding window comparison portion 208 of the first buffer 202. If the control group 206 is usable, control passes to operation 310. Otherwise, control returns to operation 302 to capture additional frames.

At operation 310, the network monitor 112 computes correlations of the control group 206 to sliding window comparison portion 208 of the first buffer 202 to calculate how closely those data representations are related. At operation 312, the network monitor 112 finds the highest correlation score of the correlations.

At operation 314, the network monitor 112 confirms that the highest correlation score exceeds a predefined threshold. In an example, the correlation score must exceed a threshold correlation such as $TH_{CC}=0.95$. If so, this delay searching process is successful and the index delay d is the index difference between these two segments and control passes to operation 316. If not, control returns to operation 302.

At operation 316, the network monitor 112 computes delay between the first and second points according to the correlation score. In an example, the timestamp delay $d_T$ is computed as the timestamp difference obtained from these two indices. After operation 316, the process 300 ends.

Postprocessing may additionally be performed using the determined timestamp delay $d_T$. For instance, temporal smoothing may be performed. For instance, at each timestamp, the abovementioned key latency search algorithm may be used to find a timestamp delay $d_T$. The delays may be placed into a buffer which contains the timestamp delays $d_T$ for a period of time such as the past 30 seconds. The actual timestamp delay $d_T$ may then be reported as the median number of those delay values in this buffer. This temporal smoothing process may accordingly be implemented to improve the stability of the latency reporting.

In another post-processing aspect, a late latency updating strategy may be implemented. Using this approach, the reported timestamp delay $d_T$ will not be updated immediately if a different latency value (e.g., after temporal smoothing) was found. The adoption of a new latency value may only occur responsive to a number of continuous values of $d_T$ being found for a predefined minimum quantity of values (e.g., 15 consecutive values). This late latency updating strategy may accordingly improve the stability of the latency reporting.

In yet another post-processing aspect, a content mismatch determining strategy may be implemented. Using this approach, if the highest correlation score identified in the process 300 is less than a predefined threshold minimum probability (e.g., $TH_{CCMIN}=0.75$) for a predefined number of times in a row (e.g., 60 times), then a content mismatch may be reported.

As an even further possibility, using the $d_T$ value and offsetting the first monitoring point by $d_T$ the video at the first monitoring point and the video at the second monitoring point may be aligned for visualization. Moreover, this alignment may also align any metadata associated with the frames of the video from the first monitoring point to the second monitoring point. For instance, this may also allow for the temporal alignment of the additional metadata (e.g., presentation time stamp, an objective QoE score such as SSIMPLUS No Reference score, etc.) that accompanies the frames of the video. This alignment may aid in analysis of the video at the first monitoring point as compared to the second monitoring point, e.g., to allow for comparison of objective QoE score between the first monitoring point and the second monitoring point.

Further aspects of the disclosure generally relate to the measurement of real-time latency of co-located video streams, as well as the use of such measurements in identifying latency between the co-located streams.

Figure 4:
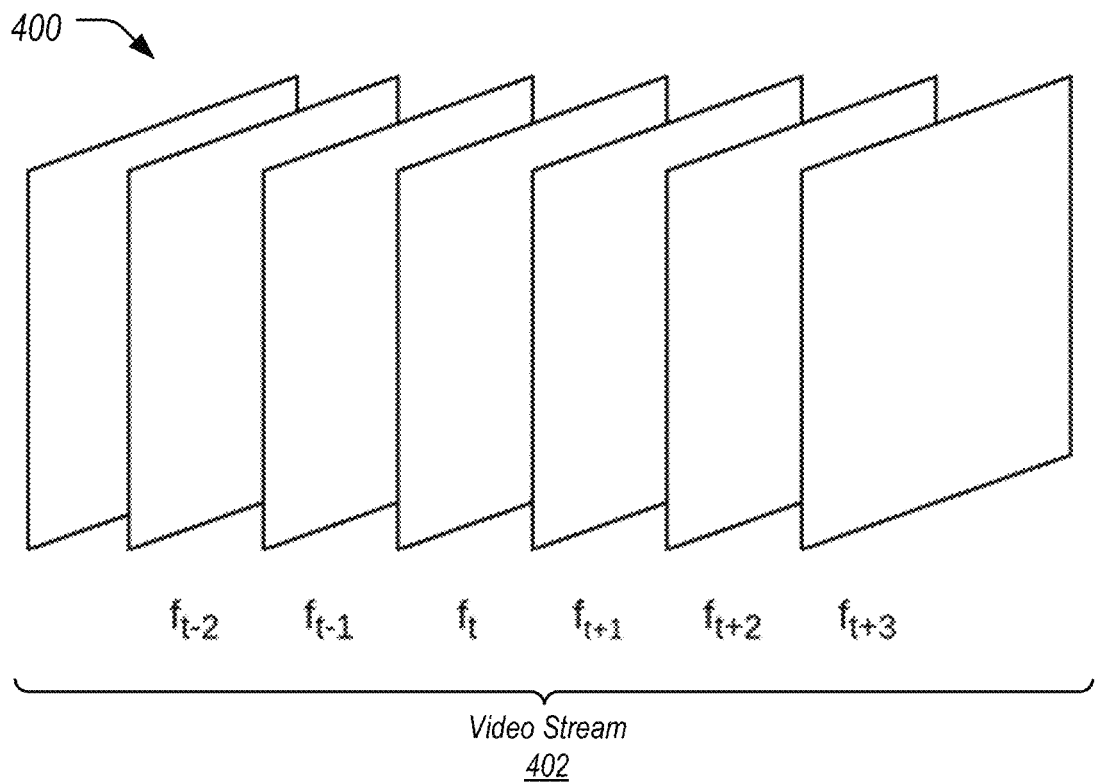
FIG. 4 illustrates an example of frames of a video signal over time.

FIG. 4 illustrates an example 400 of frames of a video stream 402 over time. As illustrated in the example 400, each of the frames f refers to an image composed of a set of pixels. The amount of information in each frame is typically referred to as a frame size or image resolution, which relates to the pixel dimensions of the frames of the video stream 402. The video stream 402 is a sequence of multiple such still images. As shown, the frames of the video stream 402 may be referenced in an order over time t, e.g., $f_{t-2}$, $f_{t-1}$, $f_t$, $f_{t+1}$, $f_{t+2}$.

Latency refers to an amount of delay between a time a transfer of data is requested or captured and the actual time that transfer begins or the video is displayed. Video latency may refer to a measurement of latency between frames of video, or between one video stream 402 and another. To measure the latency between video streams 402, first a temporal alignment is performed. Then, matched frames are located.

Figure 5:
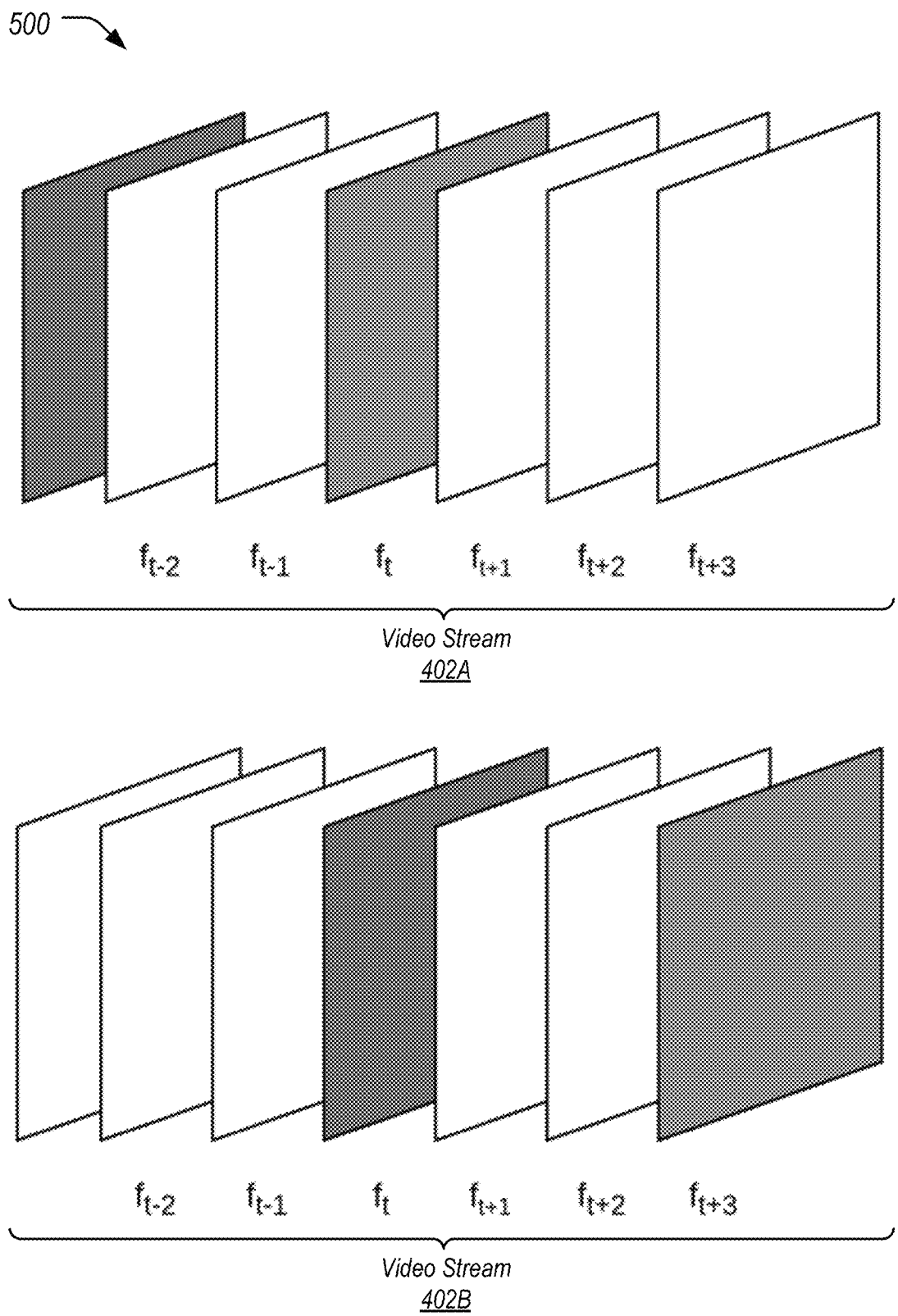
FIG. 5 illustrates an example simplified scenario having a reference video stream and a test video stream.

FIG. 5 illustrates an example simplified scenario having a reference video stream 402A and a test video stream 402B. In many real case scenarios, it is very likely that the two video streams 402 are not identical signals, but presumably have the same frame content. It should be noted that in many examples herein a single test video stream 402B is analyzed, but it is possible to utilize a single reference video stream 402A as a reference for multiple test video streams 402B.

Figure 6:
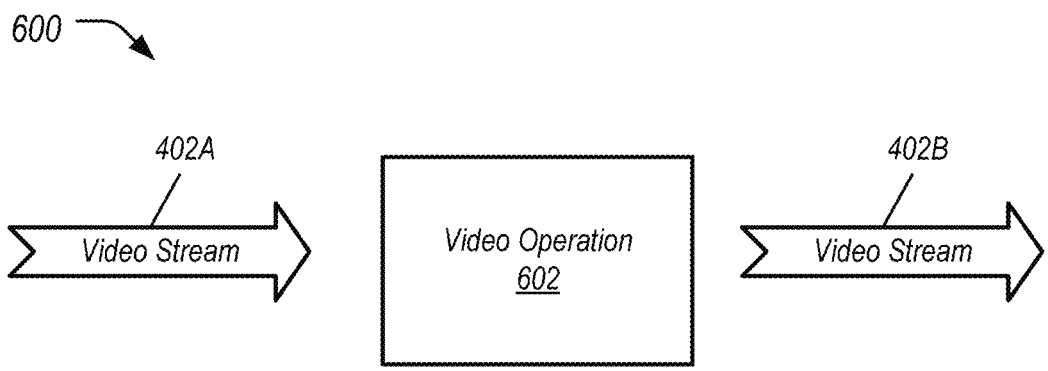
FIG. 6 illustrates an example of a reference video stream and a test video stream that are out of sync.

As shown in FIG. 6, an example scenario having a reference video stream 402A and a test video stream 402B is when a pristine signal is fed into a video operation 602 (e.g., an encoder) as the reference video stream 402A, where the test video stream 402B is the output of the video operation 602. Typically, encoding is a compression process, which introduces a delay to the input video signal. Thus, there is a delay between the input and the output of any encoder and transcoders. For the purpose of simplicity, the input and the output of encoder/transcoder are referred to herein as reference and test, respectively.

Referring more specifically to FIG. 6, FIG. 6 illustrates an example 600 of a reference video stream 102A and a test video stream 102B that are out of sync. This may occur, for example, before and after an encoding or other video operation 602. A video alignment procedure finds frame indices of the reference video stream 402A and the test video stream 402B that are matched in terms of their content. Once the video streams 402 are aligned, further operations may be performed. In one example, the relative quality of the video streams 402 may be assessed, and how much degradation is added to the reference video in the compression stage may be determined. In another example, latency may be computed by identifying the received time of the frames. Without temporal alignment, latency measurement is very cumbersome as one needs to set up an environment to closely watch the reference and the test streams, mark a scene and then note a time that the frame has been watched. Such manual processing may be prone to error and the measured latency may not be very accurate.

It may be assumed that the reference video stream 402A is ahead of the test video stream 402B in terms of time. This is a practical assumption considering encoding, compression, and other video operations 602 take time. So, if one is to observe two video streams 402 at one fixed time such as t, the reference video frame at time t appears in the test video at time t+T.

In FIG. 6, this scenario is depicted where reference frame received at time t appears in test at time t+3, e.g., where T=3. The aim of a temporal alignment (TA) algorithm is to return the T or, equivalently, the offset between the reference video stream 402A and the test video stream 402B. To align two video streams 402, buffering is performed of N number of frames from both the reference video stream 402A and the test video stream 402B. Then, the buffered reference frames are traversed to select a number of good candidates, or anchors. In the TA algorithm, these frames may be referred to as valid frames. Such selection is done based on spatial as well as temporal information of the frames. Spatial information refers to aspects of the information within a frame, such as textures, highlights, etc. Temporal information refers to aspects of the information between frames, such as motion or other differences between frames.

The spatial information (SI) can be derived using Gaussian filter, Laplacian filter, Laplacian of Gaussian filter, Sobel filter, Prewitt filter, Scharr filter, etc. and temporal information (TI) can be derived by using the average/min/max difference of consecutive frames in terms of raw pixel values, Gaussian filtered pixel values, Laplacian filtered pixel values, Laplacian of Gaussian filtered pixel values, Sober filtered pixel values, Prewitt filtered pixel values, Scharr filtered pixel values, etc. One example of Spatial Information and Temporal Information can be defined as:

$$SI = \frac{1}{N}\sum|\nabla f_x| + \frac{1}{N}\sum|\nabla f_y| \quad (1)$$

$$TI = \frac{1}{N}\sum|\nabla f_t| \quad (2)$$

where:

$$\nabla f_x = f_{(x,y,t)} - f_{(x+1,y,t)} \quad (3)$$

$$\nabla f_y = f_{(x,y,t)} - f_{(x,y+1,t)} \quad (4)$$

$$f_x = f_{(x,y,t)} - f_{(x,y,t-1)} \quad (5)$$

and 1/NΣ is to calculate the average over all pixels. Equations 1 and 2 define SI and TI features of a video frame as an operation on the spatial as well as temporal gradients of pixel values. More specifically, SI is the mean absolute value of gradient in horizontal (i.e., x), and vertical (i.e., y) dimensions of the frames, while TI is the mean absolute value of gradient in the temporal direction (i.e., t).

A frame is labeled as valid if both SI and TI features of that frame are above specific thresholds. Such thresholds for SI and TI may be defined empirically. The search for valid frames may continue until enough valid frames are found. The number of valid frames can be adjusted, but experiments over a number of reference and test pairs show that a minimum of three valid frames yields to minimum error in finding the correct offsets between two video streams 402. Since it is impossible to calculate the TI feature for the first frame, only the SI feature is used to evaluate the validity of this frame.

Figure 7:
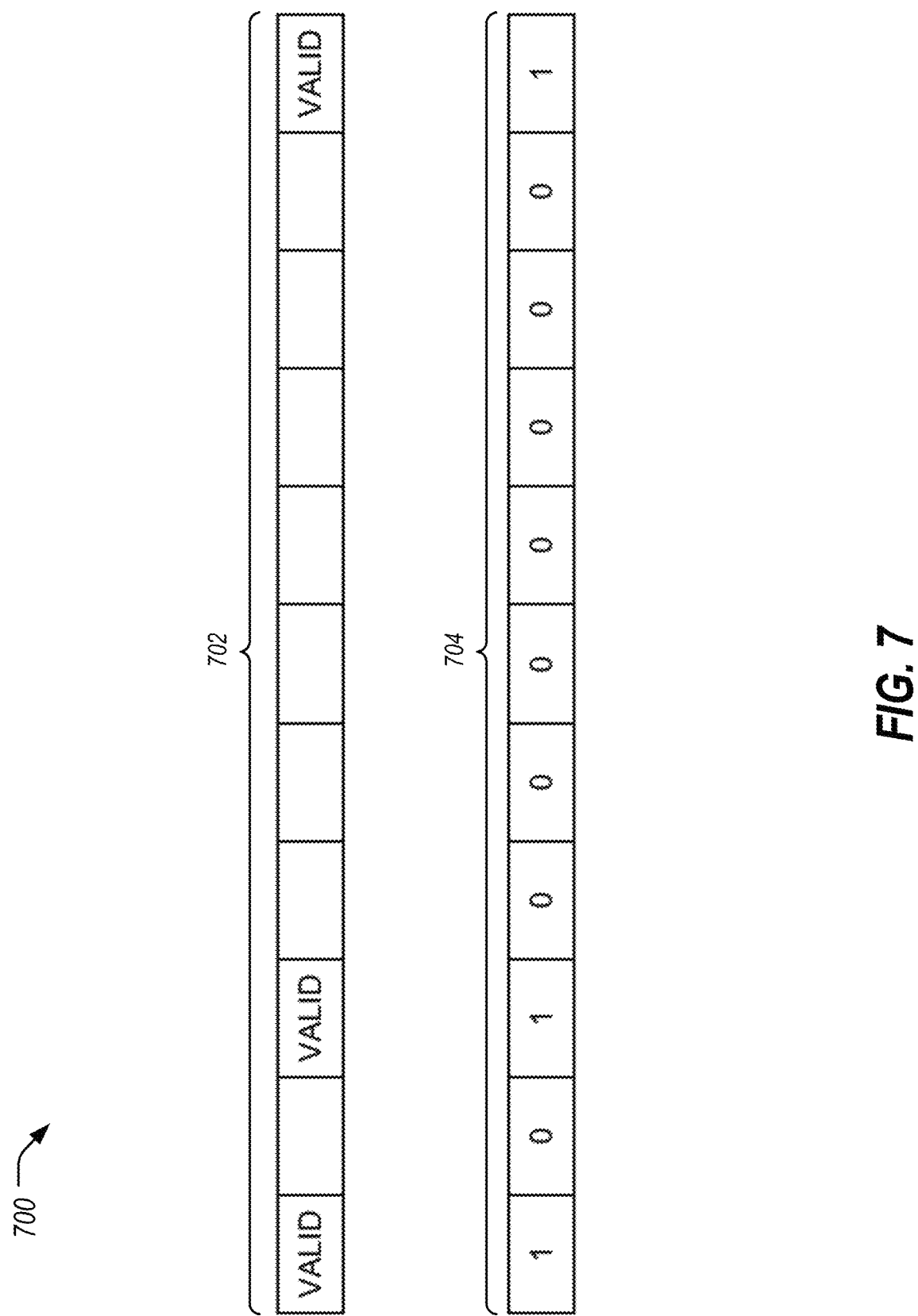
FIG. 7 illustrates an example of use of spatial information features in a selection stage for the determination of temporal alignment.

FIG. 7 illustrates an example 700 of use of SI features in a selection stage for the determination of temporal alignment. In the selection stage, a pattern of binary values is recorded that indicates whether or not a frame is valid. This vector may be referred to as the control group 702. The set of found valid frames are then put in the control group pattern vector 704. This control group pattern vector 704 is used for the next stage in the TA algorithm in which the actual comparison between the control group and the buffered test frames is performed. These comparisons may include frame-based comparisons, which, as discussed below as one example, include PSNR measurements and measurements in the temporal domain. One benefit of this over the naive approach of calculating PSNR across the entire sequence is that the control group 702 is a subsection of the entire sequence, which when combined with additional prefiltering (e.g., downscaling) reduces the computational complexity required.

After constructing the control group 702, the control group 702 and control group pattern vector 704 are used to compute differences between valid frames taken from the reference video stream 402A and their corresponding frames in the test video stream 402B. The control group pattern vector 704 is utilized for this operation to find the corresponding frame locations between the video streams 402. In an example, the differences may be computed using PSNR.

The process of calculating difference values starts from the very first frame of the buffered test video stream 402B. Each time, a set of test frames with the same length as the control group 702 is selected. The sum of difference values is then computed between valid frames, and their corresponding frames in the test video stream 402B. The sum of differences in each batch may be referred to herein as the group difference. Using a sliding window approach, the max of group difference is found and compared against a threshold. If the max of the group difference is bigger than the threshold, the approach records the frame indices of the reference video stream 402A and the test video stream 402B that result in the max value. These frame indices may be used to determine an offset in frames between the reference video stream 402A and the test video stream 402B.

Although difference measurement (such as PSNR) has a significant weight in selecting matched frames, there are corner cases that show that frame-based measurement alone may be inadequate to determine the offset. Thus, the approach may further watch the temporal information of the video streams 402 or, equivalently, motion, and may combine that with the spatial information that is caught mostly by the difference calculation.

Figure 8:
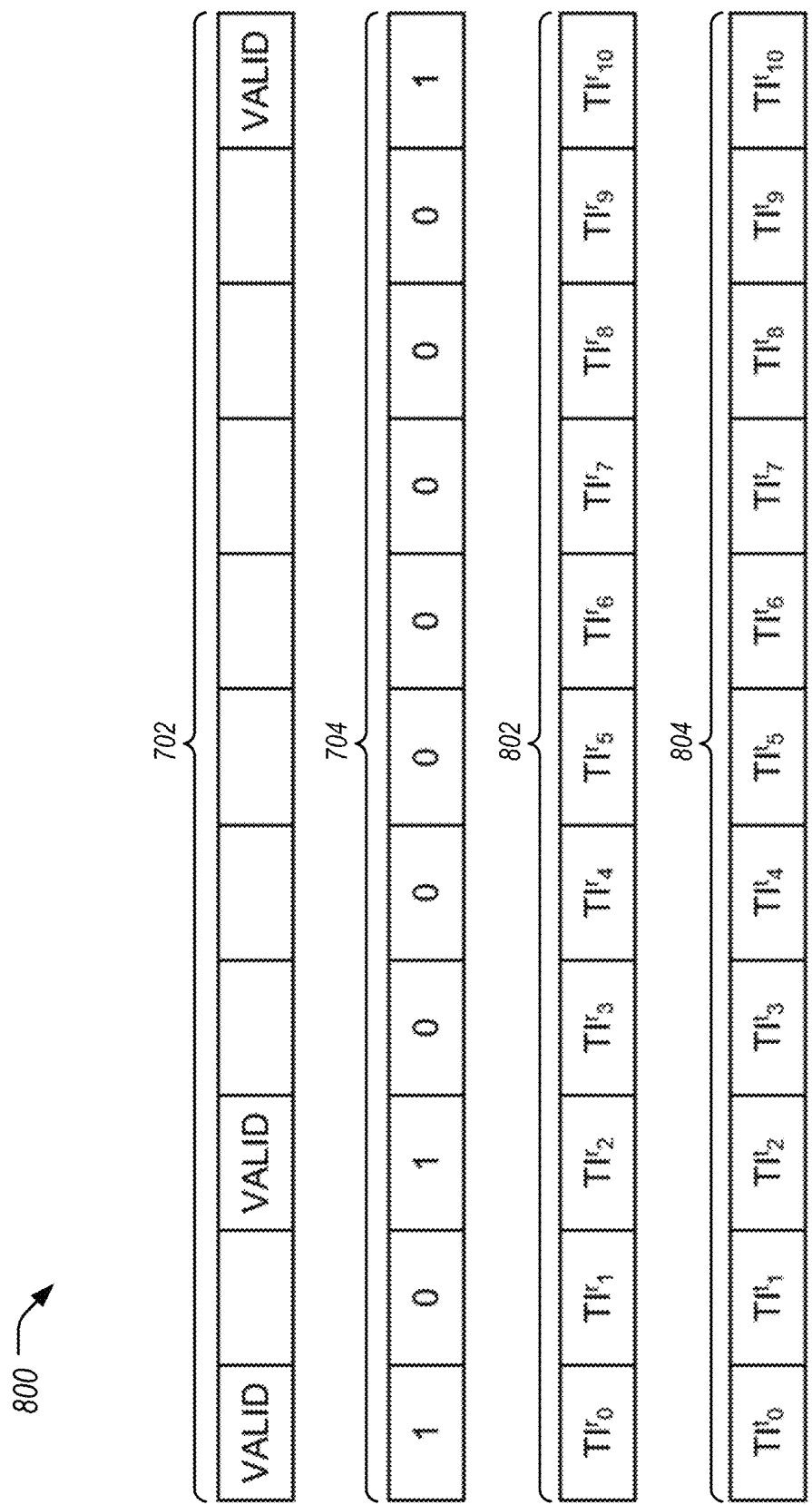
FIG. 8 illustrates an example of temporal information vectors for use in finding corresponding frame locations.

FIG. 8 illustrates an example 800 of TI vectors for use in finding corresponding frame locations. To account for the temporal information, two vectors are constructed: a TI vector of frames that contributed to control group 702 construction and the TI vector of a scan group. The reference frames that contribute to the control group 702 are readily ascertainable using the available control group pattern vector 704. Using the same sliding window framework utilized with respect to the SI features, along with the SI calculations, Pearson's Linear Correlation Coefficients (PLCC) may also be computed between the TI vector of the reference frames and the TI vector of the scan group. It should be noted that use of PLCC is but one example, and other correlation function may be used as well. As some other examples, mean squared error (MSE), root mean squared error (RMSE), mean absolute error (MAE), peak signal-to-noise ratio (PSNR), Spearman's rank correlation coefficient (SRCC), and/or Kendall's rank correlation coefficient (KRCC) may additionally or alternatively be used.

As shown in FIG. 8, an illustration of how TI vectors are generated is provided. As noted above and again illustrated, the control group 702 shows found valid frames from the reference video stream 402A, and the corresponding control group pattern vector 704 has been generated. A reference TI vector 802 may accordingly be generated from frames of the reference video stream 402A, while a test TI vector 804 may be generated as the scan group that from frames of the test video stream 402B.

Due to the nature of PLCC, and since PLCC is an indicator of the trends of signals, there can be many signals that result is high correlations where the actual values are quite different. This behavior can cause misdetection of TA offsets. (Other correlation coefficients calculations may not have this limitation.) To mitigate this potential for false correlations, the mean square error (MSE) between the two TI vectors may also be calculated. For instance, a further check may be performed to ensure that the MSE falls within a maximum allowable MSE threshold. The MSE threshold may be defined empirically.

Using the aforementioned calculations, the winning, or best, group that yields to the correct TA offset is the one that satisfies the following conditions:

Group Cost≥GroupCost$_{Threshold}$;

TI Correlation≥Correlation$_{Threshold}$; and

TI Cost≤Cost$_{Threshoold}$;

where cost is the magnitude of the difference described in equation (2). It should be noted that the thresholds may be set empirically.

Using the described approach, it is evident that TA may be performed whenever two video streams 402 are available. The input and the output of video operations 602 such as encoders are an example use case of TA. With respect to encoding, identifying the latency introduced by encoders or transcoders is one of the key criteria in selecting encoder/transcoders, and specifically in live broadcasting scenarios, lowest possible latency is highly desired. The use of temporal alignment allows for the measurement of the latency between two video streams 402 with good accuracy.

At first glance, it may appear possible to measure latency as incorporating the frame-rate of the video streams 402. In other words, having identified the frame-rate of the video streams 402, the latency between the two is simply a computation of the time difference between matched frames, for instance:

$$\Delta t = \frac{Ref_{offset} - Test_{offset}}{Frame-rate} \quad (6)$$

Equation (6) operates under the assumption that the frames of the reference video stream 402A and the frames of the test video streams 402B are buffered at the same time. However, in real case scenarios and environments, there is always a delay and mismatch between the reference video stream 402A and reading times of the frames of the test video streams 402B. The described techniques provide for an accurate latency measurement framework considering these and other practical situations.

Figure 9:
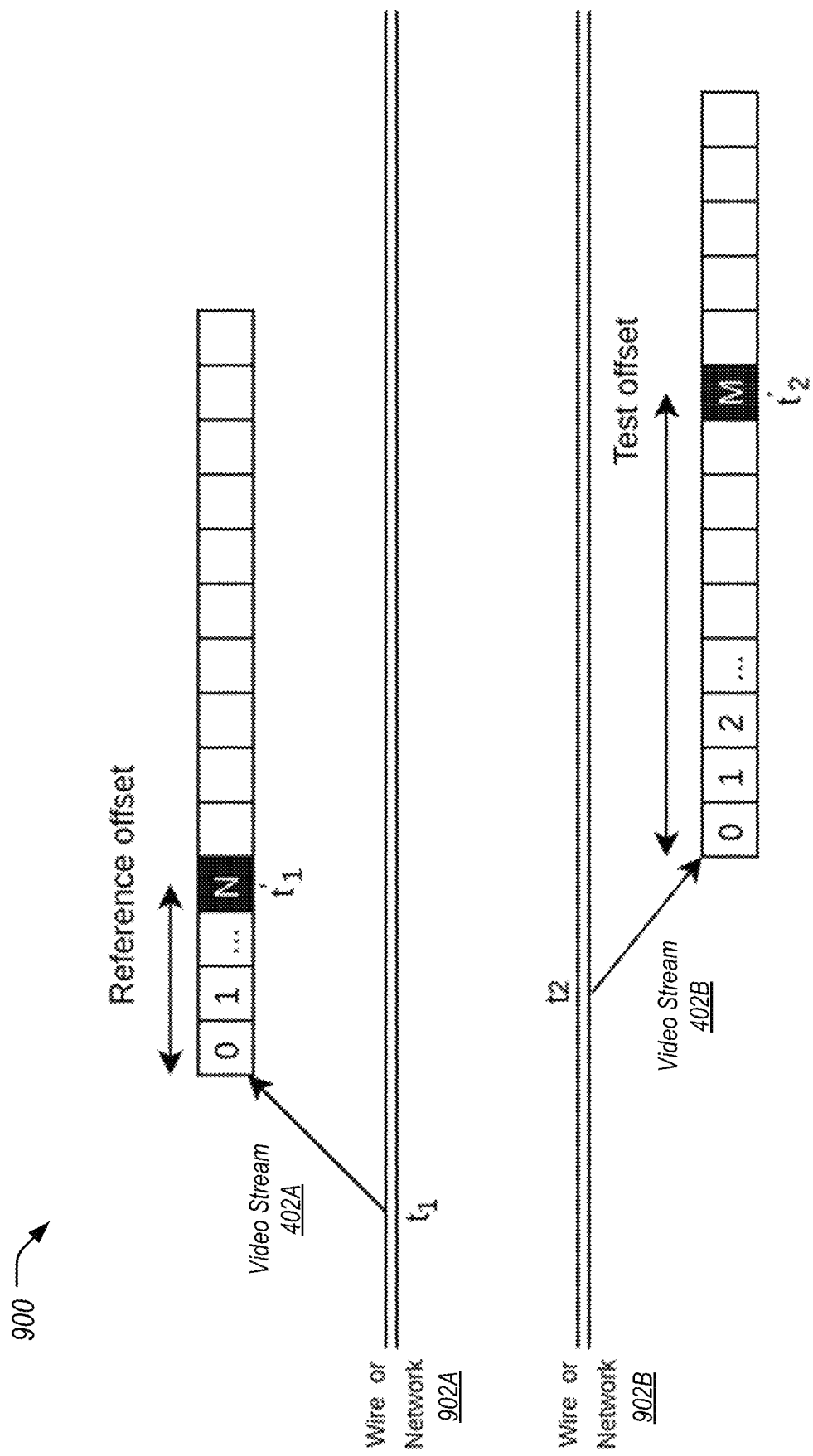
FIG. 9 illustrates an example of a practical use case of video reader agents.

FIG. 9 illustrates an example 900 of a practical use case of video reader agents. Assuming two video streams 402 are being transmitted, via wire or network connections 902. For instance, a video stream 402A may be transmitted via a wire or network connections 902A, while a video stream 402B may be transmitted via a wire or network connections 902B. In such an environment, an agent, sometimes referred to as a video reader, is used to read video packets or actual video signals out of network or wire connections 902A, 902B. (The wire or network connections 902A and 902B may be the same wire or network connection 902 or different wire or network connections 902 in various examples.)

The received time stamps of the reference video stream 402A and the frames of the test video streams 402B are different. This may be for various reasons. Without losing generality, FIG. 9 shows that the received time of the reference video stream 402A and the frames of the test video streams 402B are $t_1$ and $t_2$, respectively. In part due to this difference in timing, frames are therefore buffered before running TA algorithm. A TA agent finds the alignment offsets, as described above. As shown, the returning alignment offsets from TA are frame N of the reference and frame M of the test. It is clear that using Equation (6) can lead to an incorrect latency measurement, as the formula does not account for a difference in reading times, i.e., $|t_2-t_1|$.

The true latency is actually $|t'_2-t'_1|$, which may be expressed in Equation (7) as follows:

$$\Delta t = t'_2 - t'_1 = \left(t_2 + \frac{M}{frame-rate}\right) - \left(t_1 + \frac{N}{frame-rate}\right) \quad (7)$$

Equation (7) illustrates that in order to measure latency accurately, the reading time of the video streams 402 is to be recorded, i.e., the values of $t_1$ and $t_2$. Having these timestamps, and returning the offsets from TA module, the latency between two video streams 402 may be determined.

Figure 10:
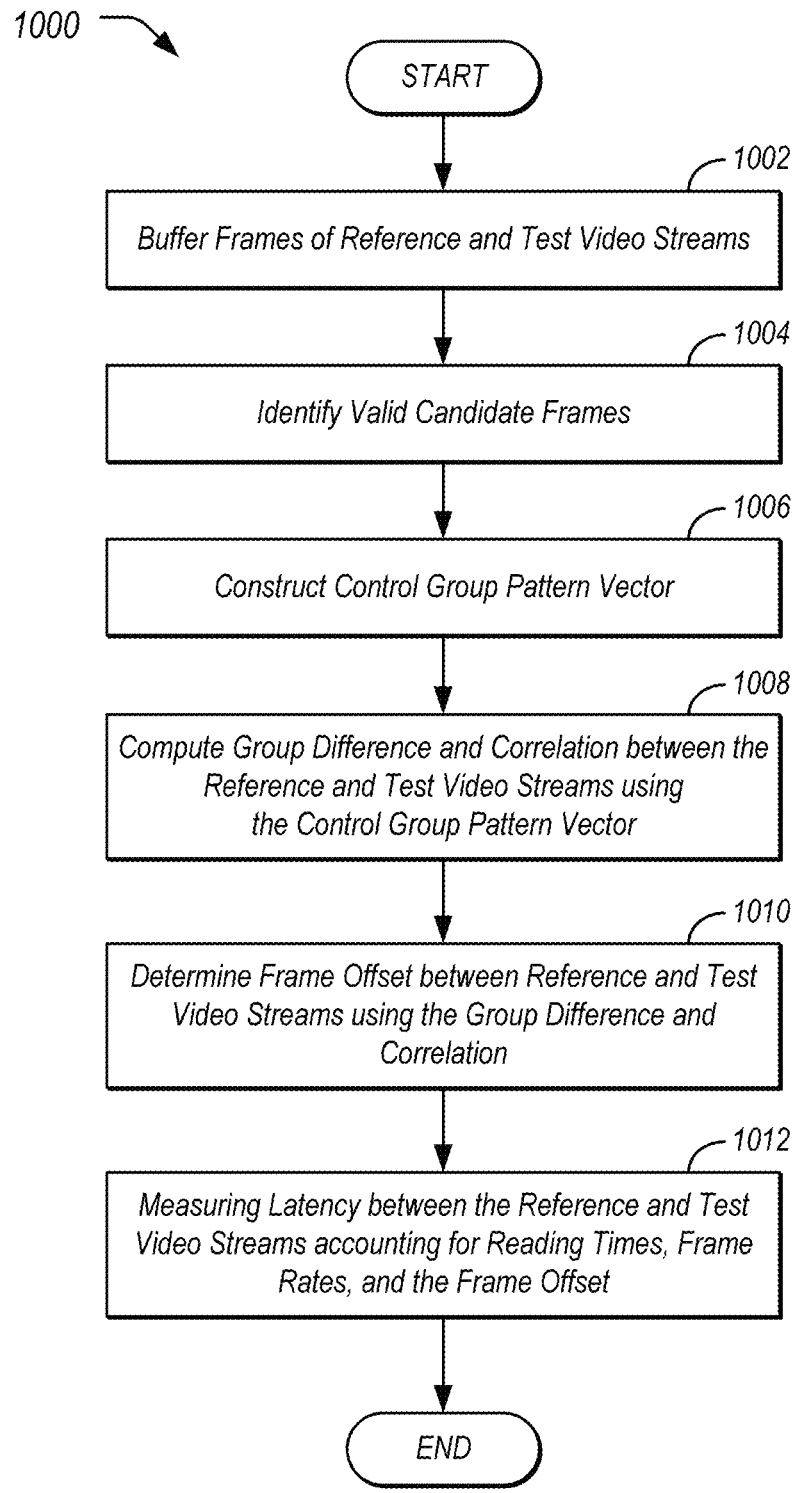
FIG. 10 illustrates an example process for the measurement of real-time latency of co-located video streams, as well as the use of such measurements in identifying latency between the co-located streams.

FIG. 10 illustrates an example process 1000 for the measurement of real-time latency of co-located video streams, as well as the use of such measurements in identifying latency between the co-located streams.

At operation 1002, frames of a reference video stream and a test video stream are buffered. In some examples, each buffered frame may have filtering applied to it, such as rescaling, sharpening, or deinterlacing to assist in processing calculations.

At operation 1004, the calculations are performed on the buffered reference frames. Spatial information refers to aspects of the information within a frame, such as textures, highlights, etc. Temporal information refers to aspects of the information between frames, such as motion or other differences between frames. The difference between frames (i.e., the temporal information) and the differences within a frame (i.e., the spatial information) are calculated for each buffered reference frame to aid in selecting valid candidate frames based on the spatial information of the buffered reference frames exceeding a spatial information threshold level, and the temporal information of the buffered reference frames exceeding a temporal information threshold level. In an example, equations 1 and 2 define SI and TI features of a video frame as an operation on the spatial as well as temporal gradients of pixel values. A frame may be labeled as valid if both SI and TI features of that frame are above specific thresholds. Such thresholds for SI and TI may be defined empirically.

At operation 1006, a control group pattern vector is constructed to indicate a pattern of valid frames as relative frame numbers. These spatial and temporal differences between frames assist in selecting At operation 1008, using a sliding window approach, a window is advanced through frames of the test video stream, for computing difference and correlation between the pattern of valid frames of the reference video stream and corresponding frames of the window in the test video stream, such that a sum of difference values in each window is computed as a group difference for the respective window.

At operation 1010, a frame offset is determined between the reference video stream and the test video stream according to the group difference and correlation. At operation 1012, latency is measured between the reference video stream and the test video stream according to reading times of the reference video stream and the test video stream, frame rates of the reference video stream and the test video stream, and the frame offset between the reference video stream and the test video stream.

Figure 11:
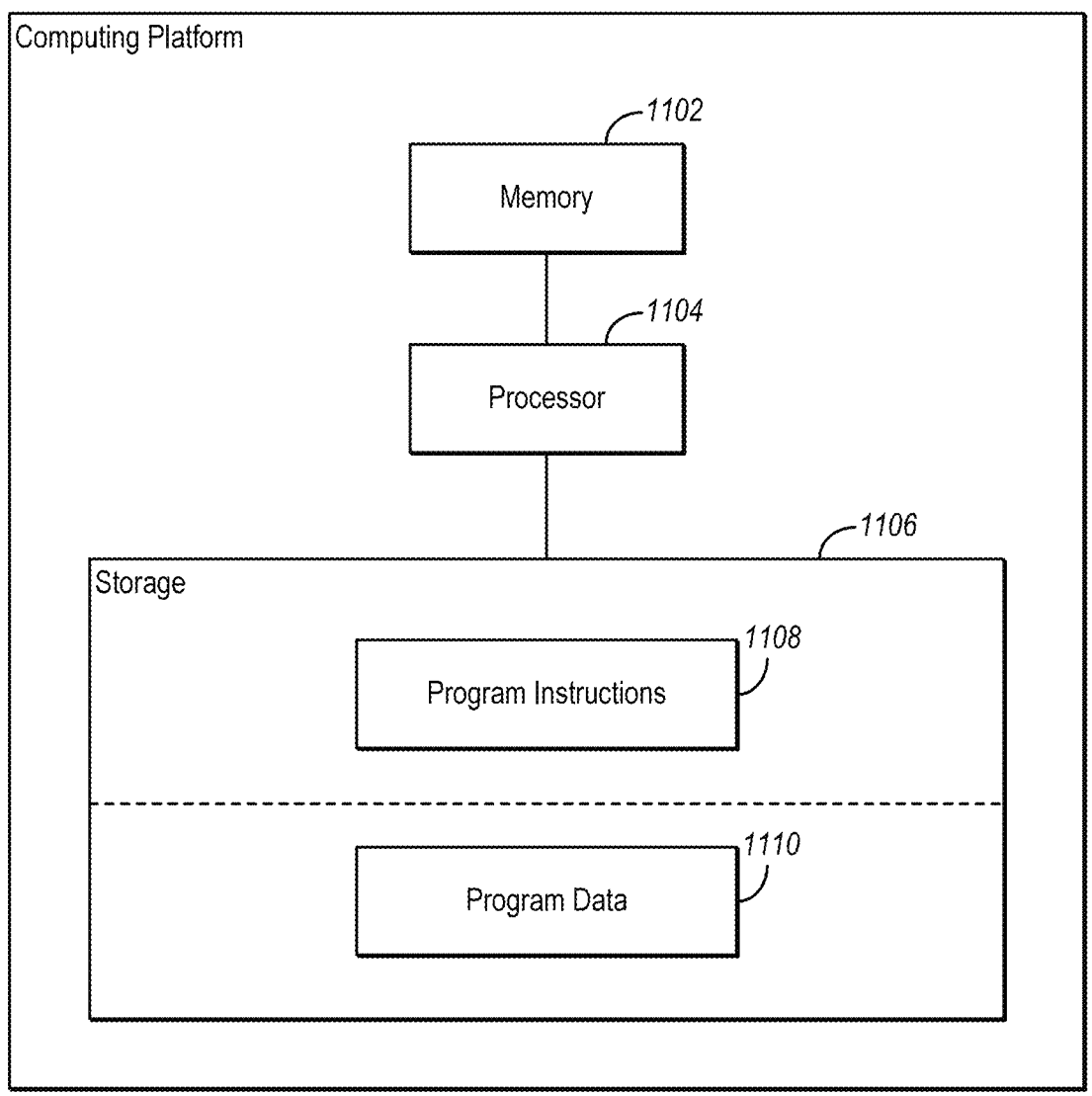
FIG. 11 illustrates an example computing device for the use of feature-based techniques to measure latency along a stream transmission pipeline as well as for performing the measurement of real-time latency of co-located video streams, as well as the use of such measurements in identifying latency between the co-located streams.

FIG. 11 illustrates an example computing device 1100 for the use of feature-based techniques to measure latency along a stream transmission pipeline. The algorithms and/or methodologies of one or more embodiments discussed herein may be implemented using such a computing device. For instance, the operations performed herein, such as those of the processes 300 and 1000, may be implemented with such a computing device 1100. The computing device 1100 may include memory 1102, processor 1104, and non-volatile storage 1106. The processor 1104 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1102. The memory 1102 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 406 may include one or more persistent data storage devices such as a hard drive, optical drive, tape drive, non-volatile solid-state device, cloud storage or any other device capable of persistently storing information.

The processor 1104 may be configured to read into memory 1102 and execute computer-executable instructions residing in program instructions 1108 of the non-volatile storage 1106 and embodying algorithms and/or methodologies of one or more embodiments. The program instructions 1108 may include operating systems and applications. The program instructions 1108 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/structured query language (SQL).

Upon execution by the processor 1104, the computer-executable instructions of the program instructions 1108 may cause the computing device 1100 to implement one or more of the algorithms and/or methodologies disclosed herein. The non-volatile storage 1106 may also include data 1110 supporting the functions, features, and processes of the one or more embodiments described herein. This data 1110 may include, as some examples, data of the first buffer 202, second buffer 204, control group 206, and sliding window comparison portion 208. This data 1110 may also include, as some other examples, data of the video streams 402, the control group pattern vector 704, reading times of the reference video stream 402 and the test video stream 402, frame rates of the reference video stream 402 and the test video stream 402, and the frame offset between the reference video stream 402 and the test video stream 402.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for identifying real-time latency of video streams, comprising:
   buffering frames of a first video stream into a first buffer;
   buffering frames of a second video stream into a second buffer;
   identifying a control group as a subset of frames of the second buffer;
   computing correlations of extracted features of the control group to extracted features of successive sliding windows of the first buffer, the extracted features being based on spatial information and temporal information of the first and second video streams, including
      performing calculations on the first video stream to identify valid frames for which the spatial information exceeds a spatial information threshold level of information and the temporal information exceeds a temporal information threshold level of information;
   constructing, as the control group, a control group pattern vector indicating a pattern of the valid frames;
   using a sliding window approach, advancing a window through frames of the second video stream to extract temporal and spatial features and to compute differences and correlation between the pattern of valid frames of the first video stream and corresponding frames of the window in the second video stream according to the temporal and spatial features, such that a sum of difference values in each window is computed as a group difference for the respective window;
   determining a frame offset between the first video stream and the second video stream according to the group difference and the correlation; and
   computing a latency between the first video stream and the second video stream according to reading times of the first video stream and the second video stream, frame rates of the first video stream and the second video stream, and the frame offset between the first video stream and the second video stream.

2. The method of claim 1, further comprising extracting the spatial information using one or more of a Gaussian filter, a Laplacian filter, a Laplacian of Gaussian filter, a Sobel filter, a Prewitt filter, or Scharr filter.

3. The method of claim 1, further comprising extracting the temporal information using one or more of an average/min/max difference of consecutive frames in terms of raw pixel values, Gaussian filtered pixel values, Laplacian filtered pixel values, Laplacian of Gaussian filtered pixel values, Sober filtered pixel values, Prewitt filtered pixel values, or Scharr filtered pixel values.

4. The method of claim 1, further comprising computing the correlations according to one or more of the following metrics: mean squared error (MSE), root mean squared error (RMSE), mean absolute error (MAE), peak signal to noise ratio (PSNR), Pearson Linear correlation coefficient (PLCC), Spearman's rank correlation coefficient (SRCC), or Kendall's rank correlation coefficient (KRCC).

5. The method of claim 1, further comprising:
   decomposing the first and second video streams into a plurality of different scales and resolutions; and
   using a different filter to extract features for each respective scale and resolution.

6. The method of claim 1, further comprising:
   decomposing the first and second video streams into a plurality of different frequency bands; and
   using a different filter to extract features for each respective frequency band.

7. The method of claim 1, further comprising:
   decomposing the first and second video streams into a plurality of different spatial regions; and
   using a different filter to extract features for each respective spatial region.

8. The method of claim 1, further comprising:
   decomposing the first and second video streams into a plurality of different groups of frames; and
   using a different filter to extract features for each respective group of frames.

9. The method of claim 1, further comprising one or more of:
   (i) decomposing the first and second video streams into a plurality of different content types, and using a different filter to extract features for each respective content type;
   (ii) decomposing the first and second video streams into a plurality of different distortion types, and using a different filter to extract features for each respective distortion type; or
   (iii) decomposing the first and second video streams into a plurality of different complexity levels, and using a different filter to extract features for each respective complexity level.

10. The method of claim 1, further comprising:
   using a multi-scale signal analysis method to decompose the first and second video streams into multiple resolutions; and
   using human visual contrast sensitive models to guide combinations of cross-scale extracted features of the first and second video stream as decomposed.

11. The method of claim 1, further comprising:
   using 2D Fourier, 3D Fourier, or Discrete Cosine Transform (DCT) analysis methods to decompose the first and second video streams into multiple frequency bands; and
   using human visual contrast sensitive models to guide combinations of cross-frequency band extracted features of the first and second video streams as decomposed.

12. The method of claim 1, further comprising:
   one or more of:
      using region segmentation methods to divide frames of the first and second video streams into regions;
      using visual saliency evaluation methods to assign spatially-varying importance factors to different pixels in the frames of the first and second video streams; and
      using the segmentation results and/or the spatially-varying importance factors to guide combinations of cross-space extracted features.

13. The method of claim 1, further comprising:
   dividing the first and second video streams into groups of frames of a fixed or variable size, and
   using a group-of-frame importance assessment method to guide combinations of per group-of-frame extracted features.

14. The method of claim 1, further comprising one or more of:
   (i) classifying frames of the first and second video streams or groups of frames of the first and second video streams into different content types, and using the content types to guide combinations of content-type-dependent extracted features;
   (ii) classifying the first and second video streams, as a whole or as groups of frames, into different distortion types, and using the different distortion types to guide combinations of distortion-type-dependent extracted features; and
   (iii) classifying frames of the first and second video streams or spatial regions of the frames into different complexity levels of different complexity measures, and using the complexity levels and the complexity measures to guide combinations of complexity-dependent extracted features.

15. The method of claim 1, wherein the first video stream is collected at a first point along a video delivery chain, and the second video stream is collected at a second point along the video delivery chain, the second point being downstream the video delivery chain from the first point.

16. The method of claim 1, further comprising:
   aligning the first video stream and the second video stream according to the computed latency between the first video stream and the second video stream.

17. The method of claim 1, wherein the spatial information includes a result of a spatial filter, and the temporal information includes a result of a temporal filter.

18. The method of claim 1, wherein the control group pattern vector is stored as a vector of binary values representing a sequence of frames, where each value of the control group pattern vector includes a first binary value if the respective frame is valid, and a second binary value if the respective frame is invalid.

19. The method of claim 1, wherein constructing the control group pattern vector continues until at least a predefined number of valid frames are located.

20. The method of claim 1, wherein the frame offset is determined to be an offset at which a group difference exceeds a group cost threshold, the correlation exceeds a correlation threshold, and a temporal information (TI) cost function result is less than a maximum TI cost.

21. The method of claim 1, wherein the latency is computed as a difference of (i) a reading time timestamp of the second video stream, plus a frame number of the second video stream divided by a frame rate of the second video stream, and (ii) a reading time timestamp of the first video stream, plus a frame number of the first video stream divided by a frame rate of the first video stream, wherein the frame number of the second video stream and the frame number of the first video stream differ by the frame offset.

22. A system for identifying real-time latency of video streams, comprising:
   a computing device programmed to
      buffer frames of a video stream into a first buffer;
      buffer frames of a video stream into a second buffer;
      identify a control group as a subset of frames of the second buffer;
      compute correlations of extracted features of the control group to extracted features of successive windows of frames of the first buffer, the extracted features being based on spatial information and temporal information of the video stream buffered into the first buffer and the video stream buffered into the second buffer, including to
      perform calculations on the video stream buffered into the first buffer to identify valid frames for which the spatial information exceeds a spatial information threshold level of information and the temporal information exceeds a temporal information threshold level of information;
      construct, as the control group, a control group pattern vector indicating a pattern of valid frames;
      using a sliding window approach, advance a window through frames of the video stream buffered into the second buffer to extract temporal and spatial features and to compute differences and correlation between the pattern of valid frames of the video stream buffered into the first buffer and corresponding frames of the window in the video stream buffered into the second buffer according to the temporal and spatial features, such that a sum of difference values Δrt each window is computed as a group difference for the respective window;

determine a frame offset between the video stream buffered into the first buffer and the video stream buffered into the second buffer according to the group difference and the correlation; and compute a latency between the video stream buffered into the first buffer and the video stream buffered into the second buffer according to reading times of the video stream buffered into the first buffer and the video stream buffered into the second buffer, frame rates of the video stream buffered into the first buffer and the video stream buffered into the second buffer, and the frame offset between the video stream buffered into the first buffer and the video stream buffered into the second buffer.

23. The system of claim 22, wherein the computing device is further programmed to extract the spatial information using one or more of a Gaussian filter, a Laplacian filter, a Laplacian of Gaussian filter, a Sobel filter, a Prewitt filter, or Scharr filter.

24. The system of claim 22, wherein the computing device is further programmed to extract the temporal information using one or more of an average/min/max difference of consecutive frames in terms of raw pixel values, Gaussian filtered pixel values, Laplacian filtered pixel values, Laplacian of Gaussian filtered pixel values, Sober filtered pixel values, Prewitt filtered pixel values, or Scharr filtered pixel values.

25. The system of claim 22, wherein the computing device is further programmed to compute the correlations according to one or more of the following metrics: mean squared error (MSE), root mean squared error (RMSE), mean absolute error (MAE), peak signal to noise ratio (PSNR), Pearson Linear correlation coefficient (PLCC), Spearman's rank correlation coefficient (SRCC), or Kendall's rank correlation coefficient (KRCC).

26. The system of claim 22, wherein the computing device is further programmed to:
decompose the video stream into a plurality of different scales and resolutions; and
use a different filter to extract features for each respective scale and resolution.

27. The system of claim 22, wherein the computing device is further programmed to:
decompose the video stream into a plurality of different frequency bands; and
use a different filter to extract features for each respective frequency band.

28. The system of claim 22, wherein the computing device is further programmed to:
decompose the video stream into a plurality of different spatial regions; and
use a different filter to extract features for each respective spatial region.

29. The system of claim 22, wherein the computing device is further programmed to:
decompose the video stream into a plurality of different groups of frames; and
use a different filter to extract features for each respective group of frames.

30. The system of claim 22, wherein the computing device is further programmed to:
(i) decompose the video stream into a plurality of different content types, and use a different filter to extract features for each respective content type,
(ii) decompose the video stream into a plurality of different distortion types, and use a different filter to extract features for each respective distortion type, or
(iii) decompose the video stream into a plurality of different complexity levels, and use a different filter to extract features for each respective complexity level.

31. The system of claim 22, wherein the computing device is further programmed to:
use a multi-scale signal analysis method to decompose the video stream frame into multiple resolutions; and
use human visual contrast sensitive models to guide combinations of cross-scale extracted features of the video stream as decomposed.

32. The system of claim 22, wherein the computing device is further programmed to:
use 2D Fourier, 3D Fourier, or Discrete Cosine Transform (DCT) analysis methods to decompose the video stream into multiple frequency bands; and
use human visual contrast sensitive models to guide combinations of cross-frequency band extracted features of the video stream as decomposed.

33. The system of claim 22, wherein the computing device is further programmed to:
one or more of:
use region segmentation methods to divide frames of the video stream into regions;
use visual saliency evaluation methods to assign spatially-varying importance factors to different pixels in the frames of the video stream; and
use the segmentation results and/or the spatially-varying importance factors to guide combinations of cross-space extracted features.

34. The system of claim 22, wherein the computing device is further programmed to:
divide the video stream into groups of frames of a fixed or variable size; and
use a group-of-frame importance assessment method to guide combinations of per group-of-frame extracted features.

35. The system of claim 22, wherein the computing device is further programmed to one or more of:
(i) classify frames of the video stream or groups of frames of the video stream into different content types, and use the content types to guide combinations of content-type-dependent extracted features;
(ii) classify the video stream, as a whole or as groups of frames, into different distortion types, and use the different distortion types to guide combinations of distortion-type-dependent extracted features; or
(iii) classify frames of the video stream or spatial regions of the frames into different complexity levels of different complexity measures, and use the complexity levels and complexity measures to guide combinations of complexity-dependent extracted features.

36. The system of claim 22, wherein the video stream buffered into the first buffer is collected at a first point along a video delivery chain, and the video stream buffered into the second buffer is collected at a second point along the video delivery chain, the second point being downstream the video delivery chain from the first point.

37. The system of claim 22, wherein the computing device is further programmed to:
align the video stream buffered into the first buffer and the video stream buffered into the second buffer according to the computed latency between the video stream buffered into the first buffer and the video stream buffered into the second buffer.

38. The system of claim 22, wherein the spatial information includes a result of a spatial filter, and the temporal information includes a result of a temporal filter.

39. The system of claim 22, wherein the control group pattern vector is stored as a vector of binary values representing a sequence of frames, where each value of the control group pattern vector includes a first binary value if the respective frame is valid, and a second binary value if the respective frame is invalid.

40. The system of claim 22, wherein constructing the control group pattern vector continues until at least a predefined number of valid frames are located.

41. The system of claim 22, wherein the frame offset is determined to be an offset at which a group difference exceeds a group cost threshold, the correlation exceeds a correlation threshold, and a temporal information (TI) cost function result is less than a maximum TI cost.

42. The system of claim 22, wherein the latency is computed as a difference of (i) a reading time timestamp of the video stream buffered into the second buffer, plus a frame number of the video stream buffered into the second buffer divided by a frame rate of the video stream buffered into the second buffer, and (ii) a reading time timestamp of the video stream buffered into the first buffer, plus a frame number of the video stream buffered into the first buffer divided by a frame rate of the video stream buffered into the first buffer, wherein the frame number of the video stream buffered into the second buffer and the frame number of the video stream buffered into the first buffer differ by the frame offset.

43. A non-transitory computer-readable medium comprising instructions for identifying real-time latency of video streams, that when executed by a processor of a computing device, cause the computing device to:
  buffer frames of a video stream into a first buffer;
  buffer frames of a video stream into a second buffer;
  identify a control group as a subset of frames of the second buffer;
  compute correlations of extracted features of the control group to extracted features of successive windows of frames of the first buffer, the extracted features being based on spatial information and temporal information of the video stream buffered into the first buffer and the video stream buffered into the second buffer, including to
  perform calculations on the video stream buffered into the first buffer to identify valid frames for which the spatial information exceeds a spatial information threshold level of information and the temporal information exceeds a temporal information threshold level of information;
  construct, as the control group, a control group pattern vector indicating a pattern of valid frames;
  using a sliding window approach, advance a window through frames of the video stream buffered into the second buffer to extract temporal and spatial features and to compute differences and correlation between the pattern of valid frames of the video stream buffered into the first buffer and corresponding frames of the window in the video stream buffered into the second buffer according to the temporal and spatial features, such that a sum of difference values in each window is computed as a group difference for the respective window;
  determine a frame offset between the video stream buffered into the first buffer and the video stream buffered into the second buffer according to the group difference and the correlation; and
  compute a latency between the video stream buffered into the first buffer and the video stream buffered into the second buffer according to reading times of the video stream buffered into the first buffer and the video stream buffered into the second buffer, frame rates of the video stream buffered into the first buffer and the video stream buffered into the second buffer, and the frame offset between the video stream buffered into the first buffer and the video stream buffered into the second buffer.

44. The medium of claim 43, further comprising instructions that when executed by the processor of the computing device, cause the computing device to:
  align the video stream buffered into the first buffer and the video stream buffered into the second buffer according to the computed latency between the video stream buffered into the first buffer and the video stream buffered into the second buffer.

* * * * *